July 30, 1963 T. HENSE 3,099,206

HIGH SPEED PRINTING APPARATUS WITH INPUT CONTROL NETWORK

Filed March 1, 1962 2 Sheets-Sheet 1

INVENTOR

THEO HENSE

BY Toulmin & Toulmin

ATTORNEYS

HIGH SPEED PRINTING APPARATUS WITH INPUT CONTROL NETWORK

Filed March 1, 1962 2 Sheets-Sheet 2

INVENTOR

THEO HENSE

BY Toulmin & Toulmin

ATTORNEYS

United States Patent Office 3,099,206

Patented July 30, 1963

3,099,206

HIGH SPEED PRINTING APPARATUS WITH INPUT CONTROL NETWORK

Theo Hense, Wilhelmshaven, Germany, assignor to Olympia Werke AG, Wilhelmshaven, Germany Filed Mar. 1, 1962, Ser. No. 176,542
Claims priority, application Germany Mar. 8, 1961
15 Claims. (Cl. 101—93)

Figure 1:
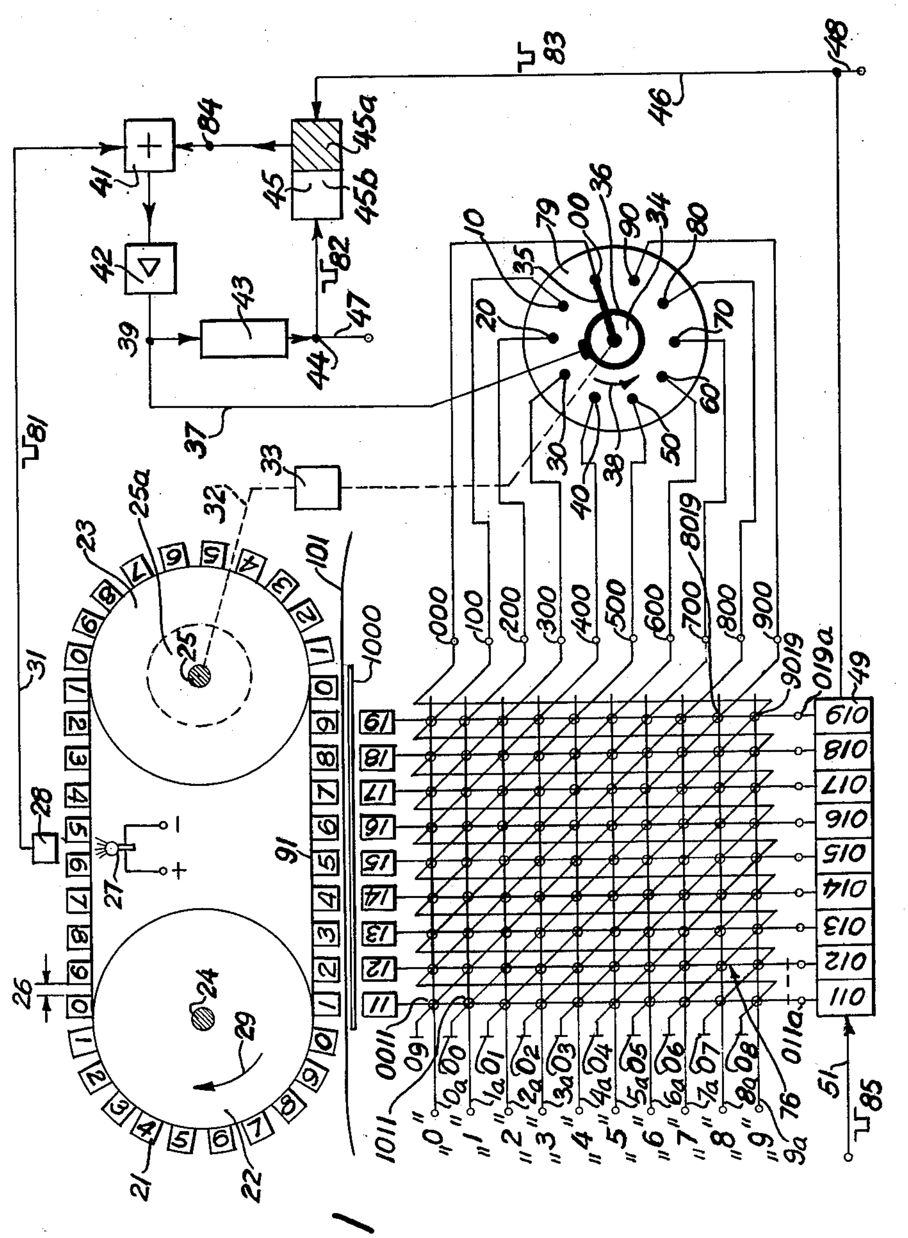

The present invention relates to improvements for a high-speed printing apparatus, especialy for those fed from a storage matrix register.

My patent application Serial No. 775,533, now U.S. Patent No. 3,048,330, discloses a high-speed printing appartus fed from a storage device, wherein the printing types are combined in one or several sets of types, and they are during the printing process moved back and forth parallel to the printing hammers and the printing paper. The types are mounted on a bar-shaped type carrier. The printing of a complete text line thereby occurs during one operating step of the set of types which is smaller than the space occupied by all of the different printing types of this parallel positioned set of types.

The printing apparatus operates together with a storage matrix, the storage cells of which consists of thyratrons, ring cores or similar elements. The cells are located in a known manner at the intersections of the line- and column read in wires.

The read-out of the storage matrix register is effected by means of diagonal wires the input terminals of which are respectively connected to contacts of a coordinating device which, synchronously to the movement of the types, switches on each diagonal or read out wire once and all of them successively thereby connecting the read out wires with a generator for a call or read out pulse.

The types within a set of types and the storage read-out wires led diagonally through the storage matrix are arranged in such a way that, during the operating step of the sets of types in any printing position, the coordinating device switches on the particular diagonal wire the storage cells of which are arranged in the respective sequence determined by the arrangement of the type positionable simultaneously in front of the printing hammers.

This coordinating condition between types and diagonal read-out wires which, in the known printing apparatus, can be effective by means of the coordination device for the time period of one operating step of the set of types, begins, after closing of a respective contact. The step ends, also through closing of a contact, at the end of the movement of the sets of types in front of the hammers.

An improvement in this printing apparatus was made according to my Patent 2,936,704. Sets of types are arranged on an endless type carrier and are associated and coordinated to the storage matrix which also operates with diagonal read-out wires. It is thus possible to replace the undesirable back-and-forth motion of the type carrier by an easily operable rotating movement. The type carrier runs over two drive wheels or guide wheels respectively so that the types in the printing range may traverse a parallel path relative to the printing hammers and the printing paper.

The types are again combined in sets of types within which an exact type arrangement is specified, improved over the first printing apparatus. The arrangement of the diagonal wires in the storage matrix register corresponds to this type arrangement.

The coordination of types and storage cells during the printing process is again effected by a co-ordinating device which successively connects each diagonal wire with the read out pulse generator. Normally the coordinating device consists of a disc made of insulating material and carrying circularly arranged contacts, connected to the read out wires. A rotating sliding contact engages successively these contacts while running in synchronism with the endless type carrier.

The coordinating device has as many contacts as there are diagonal wires and different types in a set. Upon completion of one revolution the sliding contact has engaged once every one of the contacts, and the type set on the endless carrier has carried out one operating lift. During this complete revolution all of the read-out wires have been turned on once, and all of the various types of a set have passed each printing hammer.

The storing into the register as well as the paper advancement occur during the operating steps of two sets of types. During this storing period the sliding contact of the coordinating device does not engage any of the contacts connected to the read-out wire so that the storage cells cannot be called on during storing. Those parts of the endless type carrier which are then still passing the printing hammer thus do not have supported any printing type characters as no coordinating condition then exists between the read-out wires and those blind types. These types passing the printing hammers actually pertain still to the actual printing type set and run in advance of the next set of printer types. Beginning and ending of printing and thus beginning and ending of such coordination which is in accord with end and beginning of a period for storing into the register, are marked by special contacts on the coordinating device. With regard to the direction of movement of the sliding contact arm of the coordinating device, the contact arm passes over the contact "commencement of printing" disposed immediately in front of the first contact connected to a read out wire, while the contact arm passes over the contact "end of printing" positioned directly behind the contact pertaining to the last read-out wire to be called on. Between the thus marked end and starting of printing there is a period of time associated with the period for storing of signals in the storage register.

This peculiarity of the printing apparatus requires unnecessary delays between the end of storing and the beginning of the printing. Under consideration of the number of signals to be stored, these delays add up during longer printing operations and constitute together remarkable delay which can be called "idle time."

There are known devices to reduce such idle time. For example, type wheels were developed having circumferentially disposed eight sets of types. Each set of type is marked by a special separating type marker. Although it is possible therewith to achieve a considerable increase in the printing speed, the principle of storing information immediately preceding the printing still produces a certain idle time, and the avoidance of this idle time is still not attainable with this device.

Printing apparatus operating with type wheels also include decade counter for storing coded data to be printed whereby one decade counter is associated with one printing hammer.

The printing of the datas stored in the counters are preferably carried out in such a manner that in synchronism with the rotation of the type wheel, the counters are connected to a counting pulse source by means of a collector, helically wound on a roller rotating in synchronism with the type wheel and operating similar to the mode of operating a shift register, so that in a starting position of one printing set the first counter takes on pulses; in the second position, the first and the second counter do so; in the third position, the first, second and third counter take on pulses etc.

When a decade counter has been shifted up to its highest position it drops to the zero state and thereby produces a pulse operating a printing hammer via an amplifier. Thus, the association between types, printing hammers and the various respectively stored signals in the decade counter is produced by means of the respective decade counter position.

This constitutes an essential distinction from the coordinating systems of the previously described printing apparatus fed from a storage matrix register with diagonal read-out wires, in which each different value to be printed by a hammer is assigned to only one correct storage place in the column wire which column is coordinated to one hammer only. These storage places may be called on, as described, by means of the coordinating device via the read-out wires.

In the printing apparatus with diagonal read out wires, the same particular combination of empty or filled storage cells is associated to one particular type combination of a set of types within any phase during one printing step; such fixed association between the types on the type wheels and the values stored in the associated decade counter as provided by the wiring thereof can never be achieved. Therefore, the command signal "start of printing" has a different meaning in the two printing devices.

In the printing apparatus with diagonal read-out wires only switching functions are carried out and whereas in the type wheel apparatus with decade counters the beginning of counting is predetermined which beginning necessarily coincides with the initial position of the set of types when in the starting position for printing. Without somehow identifying this initial position, the decade counters would not be able to give correct command signals to the printing hammers.

The necessity of placing the type wheels or the counters into a starting position before printing cannot be avoided so that they are still idle times between the end of storing and the beginning of printing and these idle times though shorter than in the printer with diagonal read-out wires cannot be eliminated.

If the printing is started in any other than the initial "start" printing position of the type wheels, there have to be provided additional and extensive counters which return the decade counters before commencement of printing into corrected initial positions.

In another known control device for printing apparatus, the lines of a storage matrix register are called on by means of a pulse counter which pulses are produced by slots of a disc running between a light source and a photo electric cell. The slotted disc is positioned on a shaft geared to type wheels. The printing hammers are positioned in parallel to the type wheel shaft and adjacent to the respective type wheels. The types are circumferentially disposed on the type wheels so that the printing of each line is carried out while always the same type characters are positioned in front of all of the hammers.

In addition, a slit is provided on the disc to which are associated two "start printing," pulse generators displaced relative to the disc by 180°.

The printing of a line occurs during a complete revolution of the type wheel shaft while storing and paper transportation occurs during the succeeding semi-revolution of the shaft. Thus, the second printing starts by 180° out of phase with regard to the already completed first printing. The corresponding "incorrect" position of the counter for calling on the lines of the matrix register is corrected by resetting the counter. Thus, again a correction for normal printing commencement is necessary so as to produce correct association between the position of the types and state of the storage matrix register.

It is an object of the present invention to overcome the above mentioned deficiencies and avoid all idle-times between end of storing and commencement of printing as well as during the printing so that printing can be commenced and proceed from every relative position of types and hammer.

In accordance with the principles of the invention it is suggested to arrange the types in several sets on an endless carrier with each set having its characters arranged in similar succession with no break, control marker or the like between two succeeding sets. Thus, if $n$ is the number of type characters of one set, any $n$ succeeding types, starting anywhere on the carrier comprise one complete set of types.

This type carrier is made to pass in front of printing hammers with the number of hammers being, on the one hand, equal to the number of characters to be printed in one line, and, on the other hand, equal to the number of columns of a storage matrix register having lines equal to the number and associated to the particular characters of one set.

The storage matrix register includes conventional storage elements such as ring cores or the like, individually arranged in the intersections of line and column read in wires. There are a number of read out wires passed through the cores, which latter number is equal to the number of type characters pertaining to one set. For each position of the type carrier, there is a particular combination of characters in front of the hammers, and the number of possible combinations of such positions is equal to the number of characters of one set. A read out wire is associated to a particular character-hammer position combination and is passed through those cores pertaining to the corresponding line-character-column-hammer combination.

All read out wires are connected to an associating device which enables cyclically and in succession these read out wires for read out. The cycle of succession of enabling is determined by the succession of the various type combinations when the carrier moves. Thus, there is strict synchronism between carrier movement and associating device operation. Both elements run continuously regardless whether or not any printing takes place. A pulse generator produces a train of control pulses in synchronism and phase locked to the carrier movement which pulses are fed to the associating device for passing any pulse as read out pulse into the respectively enabled read out wire.

The association device can be a simple contactor rotating in synchronism with and being geared to the carrier drive. Alternatively one can use a ring counter actuated by the control pulses in addition to its serving as enabling element for permitting passage of the pulse into the read out device.

In view of the strictly cyclic operation of the associating device and of the prescribed arrangement of the types on the type carrier, printing can be started at and from any position of the carrier, and the associating device is being phase locked to the particular passage of sets in front of the hammers. This immediate preparedness for printing is independent, for example, from the storing process and from the condition of the storage matrix register. Thus, this is the first printing device in which commencement and, of course, the corresponding termination of printing is not dependent upon any particular prior initiating movement of the types. Accordingly, one can, and it is so suggested, render the printing process fully automatic starting immediately upon completion of storage without requiring a preliminary movement of the types into a starting position so that there really is no idle time.

Complete automatic operation is achieved in deriving a pulse from the shift-register of the matrix storage device indicative of the termination of storage. This pulse is fed to an enabling switch controlling the passage of the control pulses into the associating device and into the respectively enabled read out wires. Thus, as soon as one of these control pulses is permitted to enter a read out wire, printing can commence with the types then in front of the hammers regardless what the particular combination and association device position is. There is preferably provided a device responding to the completion of one association cycle since this completion is also indicative of completion of printing of one line and of completed emptying of the storage matrix register. The enabling switch is disabled again in response to this signalling device. The carrier and the associating device continue to run but this remains ineffective until a new storage process is completed. This responding and signalling device preferably is a counter having as many positions as there are characters for one set of types.

In the following a brief example is used to illustrate the association of types and read out.

Assuming, for example, there are four type characters, R, S, T, X, and they are so arranged on the endless carrier, i.e. the arrangement is R–S–T–X–R–S–T–X–R . . . etc.; assuming further the matrix register has three columns with three hammers and, of course, four lines, then in one position of the carrier, for example characters R–S–T– are respectively in front of the first, second, third hammer. Thus, there must be a first read out wire running through the following cores identified by intersections: line for R—first column; line for S—second column; line for T third column. In the next position, characters S–T–X are respectively in front of the first, second, third hammer. Thus there must be a second read out wire running through the following cores: line for S—first column; line for T—second column; line for X—third column. The next position is: characters T–X–R respectively in front of first, second, third hammer. Thus, there must be a third read out wire running through the following cores: line for T—first column; line for X—second column; line for R—third column. Finally characters X–R–S are in front of the hammers and a fourth read out wire runs through these cores: line for X—first column; line for R—second column; line for S—third column. This completes a cycle and for read out the associating device has connected successively the first, second, third and fourth read out wire to the pulse source. It will be appreciated that a read out cycle can be started with any read out wire and at any position of the characters relative to the hammers.

Figure 2:
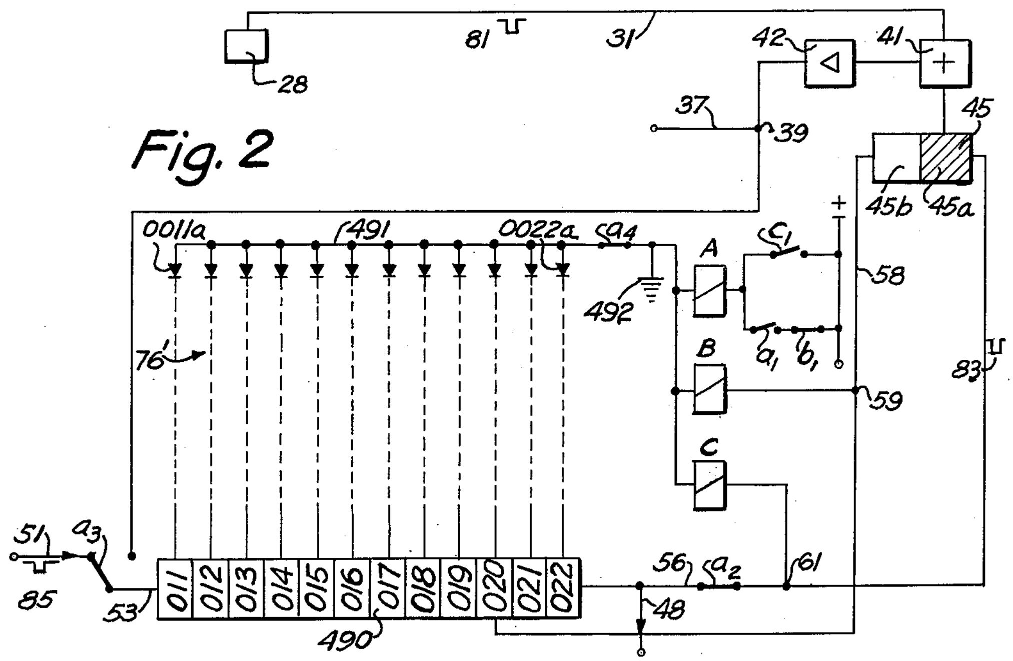
Figure 1A:
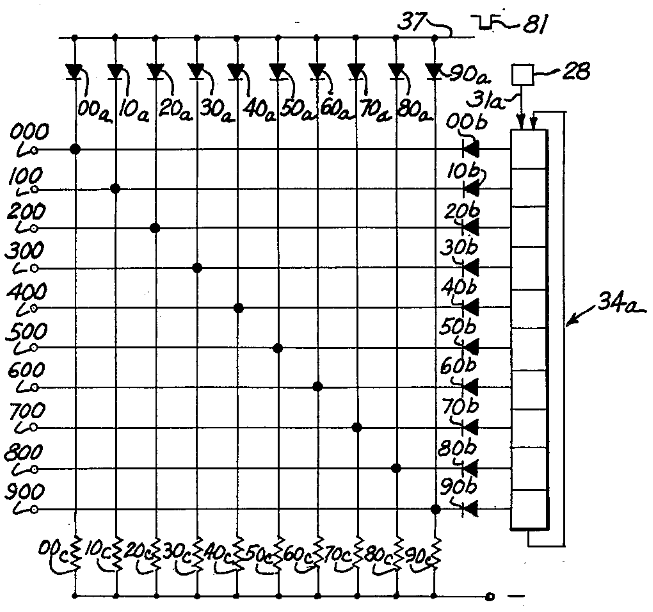

While the specification concludes with claims particularly pointing out and distinctly claiming the subject matter which is regarded as the invention, it is believed that the invention, the objects of the invention and further objects and advantages thereof will be better understood from the following description taken in connection with the accompanying drawing in which:

FIG. 1 illustrates a schematic circuit diagram of a first embodiment of the invention including schematic illustration of a type carrier, a storage matrix register, a control circuit and an associating device;

FIG. 1*a* illustrates a modified associating device with the remaining elements corresponding to those in FIG. 1 for completing the inventive combination, and FIG. 2 illustrates a modified control circuit and storage matrix register with the remaining elements again corresponding to those in FIG. 1.

In FIG. 1 there is shown an endless belt 91 supporting four sets of types 21, each set including ten types for printing digits "0," "1," "2," . . ., "9." In the following, 21–6, for example, means type printing digit "6." Since the four sets are similar they do not require individual identification. One can see from the drawing, that any succeeding ten types comprise one set.

Structures of an endless belt as type carried with individual types are disclosed in my Patent 2,936,704. Carrier 91 is reeled by two wheels 22 and 23 mounted on shafts 24 and 25, respectively, and rotating in the direction of arrow 29. A conventional motor 25*a* drives shaft 25 and thus advances carrier 91. The types 21 are not directly juxtaposed side to side but there is space 26 between adjacent types.

As indicated schematically, there is a light source 27 of conventional type positioned so that the light therefrom is alternatingly permitted to pass through the spaces 26 and blocked by the types. A photo electric receiver or detector 28 responds to the thus produced light pulses and produces a corresponding electric pulse such as 81 in a line 31. These control pulses serve to call on a storage device 76 for read out so as to control printing of the stored information.

The particular mode of producing these pulses i.e. the train of control pulses is not critical and other devices can be employed. Essential is, that control pulses are produced in a stationary scanner or the like energized in synchronism when the rotating and advancing belt 91 and in phase-locked relationship to the passing types. Utilization of the pulses 81 will be explained more fully below.

Considering any position of carrier 91, the path traversed by the types so that a complete set of types has passed a staionary point is the product of: number of types of each set (here—ten) minus 1 times width of one type plus one space "26." This is the shortest path achievable and not attainable with the known devices.

The types move in front of nine printing hammer elements 11 to 19, arranged in such a spatial relationship so that always nine of the types 21 face respectively these nine hammers.

There is a paper sheet 1000 and an ink ribbon 101 interposed between the types 21 at the path of traverse along the hammers. The sheet 1000 is advanced in a direction perpendicular to the plane of the drawing in a manner known per se, and likewise the ribbon 101 is advanced conventionally.

The elements 11 to 19 have been designated hammer elements. For reasons of simplicity each of the blocks is to include not only a printing hammer but also an electromagnetic hammer actuator and eventually a preamplifier. Devices of this type are for example illustrated and described in detail in my Patents 2,874,634 and 2,936,704 (FIG. 10A).

The elements 11 to 19 are individually electrically connected to nine register column-lines 011*a*, 012*a*, . . ., 019, respectively of the ring core type storage matrix register 76. This storage matrix register further comprises ten line wires 0*a* to 9*a* whereby the intersections of lines and columns identify the places of the magnetic storage cores. These cores are designated by four digit numerals; the first digit identifies the line number and the last three the column number intersecting at the place of such core. For the sake of clarity only four cores have been directly designated to simplify understanding of the pattern.

The particular mode of storing intelligence in this matrix register is not of immediate interest. The digit to be printed is represented by pulse fed as bit information to the similarly designated line wire. Thus, digit "0" is fed as input pulse to line wire 0*a*, digit "9" to line wire 9*a* etc.

Since the column wires are directly connected to the hammer elements, they determine the printing location for such digits. In a conventional manner, the magnetic state of a core is flipped to one extreme magnetization condition (saturation) upon coincidence of a line and of a shift register, column pulse. It should be noted, that such storage pulse is ineffective in the hammer element device to which it is connected. Since the hammer elements each have an input amplifier and since the storing pulse is of a particular polarity, appropriate amplifier bias can be made to suppress from the amplifier pulses of such polarity as the storing pulses in and for the column wires.

Storing is carried out by successively energizing the column wires by means of a counter 49 composed of nine stages 011, 012 . . ., 019 respectively, connected to column wires 011*a*, 012*a* . . ., 019*a*; simultaneously, the digit to be stored in the particular column register is applied as bit information to the corresponding line.

Counter 49 is a conventional one and is comprised of flip flops connected so as to successively activate each other. There is an input line 51 connected to the first stage, 011 and feeding a pulse 85 thereto. Stage 019 is connected to an output line 46.

Upon application of a train of pulses to line 51, usually clock pulses or command pulses "shift register" from a computer or the like, the stages 011 to 019 are energized in succession so as to render each column line responsive for storage whereby in one core of each column so energized a pulse is stored by coincidence with a pulse in any of the line wires. This is conventional.

For read out, there are provided ten diagonal read out or output wires designated $0_0$ to $0_9$, which are grounded with one end and respectively connected to terminals 000 to 900 with their other end. The wires each traverse a number of cores. Output wire $0_3$, for example, is connected as follows: terminal 300—cores 2019, 1018, 0017, 9016, 8015, 7014, 6013, 5012, 4011—ground. Wire $0_0$ is connected: terminal 300—cores 9019, 8018, 7017, 6016, 5015, 4014, 3013, 2012, 1011—ground. The pattern is readily susceptible from these examples. Read out wire $0_0$ when called on, can cause hammer 19 to print "9," hammer 18 to print "8," hammer 17 to print "7," hammer 15 to print "5" etc. depending, of course, that the respective cores contain such information to be read out and printed.

The invention is primarily concerned with an association of printing types as arranged on carrier 91 and the read out wires as traversing the cores so that upon successive calling of each read out wire, the type carrier 91 has to be moved only by one type width for a new printing position or, conversely since type carrier 91 is advanced continuously, with the advancing by one type-width only, another read out wire can be called on. This will become more apparent later in this specification.

One of the most important elements of the inventive combination is an associating device 34, having, for example, a stationary and rotary part. The rotary part is comprised of a slider contact arm 35 connected to shaft 25 via a gearing arrangement 32, 33 so as to positively follow the advancement of type carrier 91.

Associating device 34 has a stationary part comprising of ten annularly arranged contacts 00, 10, 20 . . . 90 mounted on an insulating disc 79. Upon rotation of arm 35 contact is made successively with these stationary contacts, and during one operating cycle all contacts have been passed over. The gearing 32, 33 is selected so that arm 35 makes contact always when nine types 21 are just about juxtaposed to nine hammers, and upon moving of the arm 35 to the next contact, carrier 91 has moved by just one type width plus one space 26.

Contacts 00 to 90 are respectively connected to terminals 000 . . ., 900, which were described as being connected to the diagonal or read out wires of the storage matrix register 76.

Disc 79 is provided with a stationary ring contact 36 always engaging arm 35 for contact making. A connecting wire 37 is connected to ring contact 36. Thus, upon rotation of arm 35, this wire 37 is successively connected to the read out wires of storage matrix 76.

From a more general point of view, each read out wire, contact and connecting terminal (for example $0_0$, 00, and 000) constitute a read out channel, with the channel's being cyclically activated or enabled by rotating arm 35.

FIG. 1 illustrates a true momentary position: Contact arm 35 engages contact 00, thus wire 37 is connected to the diagonal read out wire $0_0$ running through cores 1011, 2013, 3013, 4014, 5015, 6016, 7017, 8018, 9019 (supra). It will be remembered that the first digit of the core designations refer to the numeral to be printed when the respective core has stored a signal, while the two last digits refer to the position on the paper and the particular column. In FIG. 1 it is also shown that in this particular moment, there is positioned above hammer 11 the type for printing "1," above hammer 12 the type for printing "2" etc. Thus, if any of the cores passed through by wire $0_0$ connected to line 31, has stored a signal the respective hammer will be energized and the proper digit be printed in the proper place on the paper.

If arm 35 is shifted so as to engage contact 10, carrier 91 has moved by one type width plus one space 26 to the left. The following table shows the association at this operating position, of hammers with types, and with cores passed through by read out wire $0_1$.

| Hammer | 11 | 12 | 13 | 14 | 15 | 16 | 17 | 18 | 19 |
|---|---|---|---|---|---|---|---|---|---|
| Type | 2 | 3 | 4 | 5 | 6 | 7 | 8 | 9 | 0 |
| Core | 2011 | 3012 | 4013 | 5014 | 6015 | 7016 | 8017 | 9018 | 0019 |

Thus again the content of any of these cores will cause proper printing. It is readily ascertainable, that in any position of arm 35 there is proper association of the type characters, the hammer and the cores passed through by that read out wire then connected to line 37 via arm 35. Upon one complete revolution of arm 35 the entire set of type characters has passed all hammers, and all read out wires and all cores were called on.

Respective printing is caused by a pulse passing from wire 37 into the respectively connected read out wire. In the following it will be explained how this activator pulse is obtained. In particular, in the following a control circuit will be described rendering printing completely automatic.

Line 37 is connected to a terminal 39 which is the output terminal of an amplifier 42 which in turn is connected with its input to a switching element such as a logic "and" gate 41. "And" gate 41 has two inputs, one, the main input terminal is connected to line 31 running from pulse generator 28; this connection is made to supply a control pulse from generator 28 through gate 41 to line 37. In other words, gate 41 gates the activation and read out pulse for associating device 34 and matrix register 76, which control and read out pulse is derived from generator 28.

The second input terminal of gate 41, is for the gating pulse to be derived from a switch 45, for example, a bistable flip flop (see for example FIG. 10H of my Patent 2,936,704).

Switch 45 has one of its two output terminals connected to this gating input terminal of gate 41 by means of a wire 84.

The switch 45 has two input terminals. If switch 45 is an electronic flip flop, it has two interlinked stages **45*a* and 45*b* and each stage thereof is connected to one input terminal. For facilitating the understanding of the invention, 45*a* shall be designated the "on" side and 45*b* the "off" side, which means, if the input of stage 45*a* is activated, the switch 45 is flipped and considered in "on" state and produces an input gating signal for gate 41. If the input for stage 45*b* is activated, the switch is flipped back and is in "off" state and gate 41** is thus blocked.

The "on"-side of switch 45 is connected to line 46 which in turn was connected to the output (element 019) of counter 49. The "on" pulse is designated by 83. The "off" side of switch 45 is connected to a terminal 44 and a counter 43 interconnects terminal 39 and terminal 44. The output pulse of counter 43 is designated by 82.

"On" pulse 83 appears always after counter 49 has activated all columns for storage. Thus, pulse 83 appears after completion of storing in matrix register 76.

Counter 43 has so many stages as there are different characters for one type set on carrier 91, which is ten in this example.

There were also ten read out wires and ten contacts of associating device 34. This number is not imperative, but it is critical for proper operation, that the number of different type characters, the number of contacts of associating device 34, the number of read out wires, and the number of lines of the storage matrix is similar.

Assuming for a moment that gate 41 is open, then pulses from generator 28 pass through, to terminal 39, into counter 43. There will be an output pulse 82 after ten pulses or, more general, after a number of pulses indicating that a complete set of types 21 has passed under or at generator 28.

It will be noted from looking at the types, that for each of the four sets there is no definite beginning or no definite end, also associating device 34 has no definite starting position.

This is an important feature of the invention. Considering a moment when a pulse 83 has turned switch 45 on thus opening gate 41. After ten pulses from generator 28 one knows, that a complete set of types has: (*a*) passed generator 28, (*b*) passed every hammer. After ten such pulses 81 counter 43 produces pulse 82 and turns switch 45 off thus blocking gate 41 and no further pulses 81 may pass through. Simultaneously to this passing of a complete set of types, i.e. between the occurrence of pulses 83 and 82, arm 35 made one complete revolution and called on all read and wires and all of the cores of the register.

The drawing shows lines 44 and terminal 46 connected to further terminals, 47 and 48, respectively, so that pulses 82 and 83 can be utilized additionally. This might be important since pulse 83 designates: (*a*) termination of storage (*b*) commencement of read out and printing. Pulse 82 designates: (*a*) end of printing, (*b*) termination of emptying storage matrix 76.

Thus, pulse 82 can, for example, be used to control advancement of paper 100 and to control commencement of further storing. My patent (Serial No. 775,355) describes utilization of pulses and the pulses designated with $i_{10}$ and $f_{21,22}$ in this patent can be considered as respectively corresponding to present pulses 82 and 83.

The complete operation of the device illustrated in FIG. 1 is as follows:

It shall be assumed that the illustrated position exists at the moment when storing has just been completed; switch 45 is yet "off," gate 41 is closed. Of course, carrier 91 is running, so does arm 35, but nothing happens with regard to printing. It will be appreciated, that when printing is to be commenced, no initial acceleration of the movable elements: 91, 21, 32, 33, 35, is required.

Upon actual completion of storing, pulse 83 appears and turns switch 45 on, gate 41 opens and the next pulse 81 may pass through gate 41 and amplifier 42 to terminal 39. Pulses 81 now are (*a*) counted in counter 43, (*b*) passed into associating device 34, particularly to contact 00 thereof, and read out wire $0_0$ is called on. If any of the cores traversed by this read out wire is in its energized state, the pulse 81 will reverse the magnetization and the voltage thus induced in the respective column line wire energizes the hammer element to which it is connected. This output pulse is of opposite polarity as the storage pulse for such core when charged.

The hammer responds and the proper symbol is printed on the desired place i.e. position, on the paper 1000. The carrier 91 continues to run and another pulse 81 is produced in generator 28 and is counted in counter 43. Also, the next read out wire $0_1$, is activated.

It will be appreciated, that upon suitable preadjustment of generator 28, there will always be a pulse 81 when arm 35 engages a stationary contact and when the types 31 are in proper printing position. Of course, since the hammers have to be accelerated for printing one must allow for a small delay in that the pulses 81 are produced and arm 36 engages a contact slightly before the types are in proper printing position, so that the hammers though delayed impinge properly upon the paper and the types just when the latter have the required position.

It will be understood, that a complete line is printed with the carrier 91 having moved no more than the space required by one set of types. Thereafter, all cores of the matrix register have been called on, and counter 43 produces pulse 82 turning off switch 45 thus blocking "and" gate 41. The carrier and the arm 35 continue to run but this remains ineffective. Pulse 82 may be used to commence a new storing procedure and advancing of the paper. A new printing cycle will commence when a new pulse 83 is produced, and it does not matter at what particular positions the carrier 91 and the arm 35 are when this new command pulse 83 occurs, since between starting and termination of the printing of any line always all types making up a set will have passed along all of the hammers.

It will be appreciated, that the number of characters to be printed on one line on paper 1000, i.e. the number of hammers is not important but can be decreased or increased as desired. Of course, the number of register columns has to be altered accordingly, so does the number of stages of counter 49.

The counter 43 and 49 can be of any suitable conventional design. Preferably pulse 82 is fed back into counter 43 for causing reset, so does pulse 83 for counter 49. Preferably, the counters are electronic elements so as to reduce the number of mechanically movable i.e. slow parts.

Gate 41 is a conventional logic "and" gate of the diode, transistor, tube or the like type. It can also be a relay. Switch 45 preferably is a bistable flip-flop, as stated, also of the tube, transistor or the tunnel diode type. Suitable elements can, for example, be found in my Patent 2,936,704 and in Robert Ledley, "Digital Computer and Control Engineering—McGraw-Hill, 1960." 42 is a conventional electronic pulse amplifier.

FIG. 1a illustrates that the associating device 34 of FIG. 1 can also be an electronic element. There are again terminals 000 to 900, however, they are respectively connected to the output terminals of logic "and" circuits of the diode type. The "and" circuits are connected with one input branch each to line 37 (00*a*, 10*a*, 20*a* . . ., 90*a*) while the other input branches (00*b*, 10*b* . . ., 90*b*) are connected to a ring counter 34*a* having ten stages. The ring counter 34*a* thus is a switching element successively preparing the "and" circuits as gates, so that the pulses from line 37 can pass to terminals 000, 100 etc., in a manner similar to that shown in FIG. 1.

The ring counter 34*a* is preferably connected also to pulse generator 28 by means of a wire 31*a* so that the ring counter 34*a* is operated in strict synchronism with the moving of carrier 91. Ring counter 34*a* is not affected by the pulses 82 and 83 of FIG. 1, while in line 31*a* the same pulse 81 is effective as is pulse 81 in line 31. The "and" circuits are completed by resistors 00*c*, 10*c*, . . ., 90*c* connected to a negative voltage potential.

In the preceding embodiments, the counter 49 initiated printing immediately upon termination of the storing process, while counter 43 determined the termination of the printing of one line.

FIG. 2 illustrates an embodiment showing how one can omit counter 43 so that the entire printing process is determined and controlled by one counter only. The condition is, that the number of types is similar to or smaller than the number of positions of one printed line, i.e., the number of hammers and of register columns.

FIG. 2 illustrates a counter 490 as control counter for the matrix register columns, here having twelve positions. Accordingly, there are twelve column wires and twelve hammers (not shown). Counter 490 is a substitute for and is analogous to counter 49 in FIG. 1 as far as the shift register during storing is concerned. The counting elements 011 to 019 correspond directly to those in FIG. 1 but elements 020, 021, 022 have been added.

Numeral 53 designates the input line for counter 490 being supplied with the shift register pulses 85 as in FIG. 1 but now passing over a blade $a_3$ pertaining to a relay A to be explained below.

Counter 490 has two output lines. One is designated by 56 which corresponds to line 46 in FIG. 1; thus line 56 feeds the counter output pulse 83 to switch 45, particularly the "on" side thereof; this also corresponds to FIG. 1, since the counter output in this connection still indicates termination of storing so as to turn on switch 45—opening gate 41 so that printing can commence.

However, wire 56 is governed by a blade $a_2$ also pertaining to relay A. Blade $a_2$ is normally closed (relay A non-energized).

Counter 490 has a second output wire 58 which is connected to counter element 020. This connection is predetermined by the amount of types for one set. In the instant examples, always ten type characters have been used. If it were nine, connection were to be made to element 019, if a set of types consists of twelve types, the second output 58 were also to be connected to element 022. Thus, no higher amount of different types than there are counter stages, register columns, and hammers is permitted here.

Line wire 58 connects counter stage 020 to "off" side 45*b* of switch 45.

In FIG. 1 the output terminal 39 of amplifier 42 served to feed the amplifier output signal to associating device 34 (or the "and" gates in 34*a*) via a line 37, as well as to counter 43. In FIG. 2, the same line 37 is present and so indicated, performing the same function. Thus, the same association analogous arrangement as previously described for effecting matrix resister read out is present in this embodiment and has been omitted to avoid repetition. However, since counter 43 is omitted in FIG. 2., terminal 39 is here connected to a line 52 which can be connected to line 53 when blade $a_3$ is in its alternative position.

The matrix register 76' is only schematically indicated in FIG. 2 but follows the same principal layout as that in FIG. 1. Aside from being connected to the hammer elements, the column wires are individually connected to diodes 0011*a* to 0022*a* joined at a common line 491 which is governed by a blade $a_4$, also of relay A, and is grounded (492).

Relay A is connected between a suitable voltage source terminal and ground. Its connection is governed by two circuits, one including a blade $c_1$ of a relay C, while the other circuit includes holding blade $a_1$ and a series blade $b_1$ of a relay B.

Relay B is connected between ground and line 58 at terminal 59.

Relay C is connected between ground and terminal 61 which is on that side of line 56 which is governed by blade $a_2$.

Relay A, when unenergized connects line 51 to 53, by means of blade $a_3$, i.e., renders the counter 490 responsive to pulse 85; blade $a_2$ is closed so that output pulse 83 indeed can turn switch 45 on. Also, blade $a_4$ is closed during the read in process.

Relay C is energized by pulse 83 for the duration thereof and thus temporarily closes its blade $c_1$, thereby causing relay A to be energized. Closing of blade $c_1$ must be sufficiently long so that relay A can close its holding blade $a_1$. Energization of relay A results in line 52 being connected to line 53 via blade $a_3$ so that now counter 490 is subjected to the amplified pulses 81. Blades $a_2$ and $a_4$ are now open.

Relay B responds to an "off" pulse produced by element 020 and simultaneously applied to switch 45. Response of relay B opens the holding circuit for relay A and the entire relay network is thereafter again in the illustrated position.

The entire device operates as follows:

First, in storage matrix 76, intelligence is successively stored by controlling counter 490 for shift register. When the tenth column is acted upon, there is a pulse in line 58, but it remains ineffective since switch 45 is then already "off." Also, blade $a_1$ is open so that the brief response of relay B in opening blade $b_1$ is ineffective.

When storage is completed, pulse 83 is produced, and switch 45 is turned "on" so as to open gate 41. Simultaneously relay C responds, energizing relay A which remains energized during the now following printing cycle during which blade $a_3$ connects the counter 490 to terminal 39.

With "and" gate 41 being opened, pulses 81 from generator 28 may pass to terminal 39. These pulses perform in line 37 the same function as was described in connection with FIG. 1; thus, they cause successive read out and printing. In addition, the pulses 81 are counted in counter 490 until element 020 responds, and an "off" pulse appears in line 58 causing switch 45 to be turned off and also causing relay B to inactivate relay A. Now gate 41 is closed again, and blade $a_3$ connects again line 53 to line 51 so as to receive new storage control pulses 85.

During printing, blade $a_4$ was open thus preventing that the counting process during the printing and read out effects the matrix resister.

The invention is not limited to the embodiments described above but includes conceivable modifications. Such modifications are possible primarily with regard to the individual circuit elements employed. For example, the storage matrix register can include and be composed of all those elements commonly employed as storage elements in digital computers. Furthermore, all switching operations can be carried out by electrical as well as electronical switching elements. Examples of such elements can be found in the various publications and patents cited above.

I claim:

1. In a high speed printing apparatus, the combination comprising: an endless type carrier supporting at least two complete sets of types each set including *n* types with all sets being disposed on said carrier with similar succession of types and every *n* succeeding types comprise one set; a plurality of printing hammers; means for moving said carrier in front of said hammers parallel thereto whereby all of said hammers are individually and simultaneously alignable in a printing position with respectively a similar plurality of succeeding types on said carrier for printing so that after passage through *n* succeeding printing positions a complete set of types has passed in front of any hammers; a pulse generator producing electrical control pulses in synchronism with said moving types; a storage matrix register with storage elements and having line wires corresponding to the type characters, and column wires with each column being associated with a hammer for print control, said storage elements being respectively disposed at the intersection of a line wire and of a column wire; a plurality of read out wires with each wire coupled to those elements, one for each column, pertaining to a succession of lines corresponding to a predetermined combination of type characters as positionable simultaneously in front of said hammers in printing position upon movement of said carrier; associating means connected for enabling said read out wires in synchronism and cyclically with the passage of any complete type set in front of any hammer; and means for passing said control pulses through said last associating means into the respectively activated read out wire.

2. In a high speed printing apparatus, the combination comprising: a storage matrix register having storage elements, line wires and column wires disposed so that there is one element for each intersection of a line and of a column; electrically controllable printing hammers connected to said column wires; an endless type carrier supporting at least two complete sets of *n* type characters, with all sets being disposed on said carrier with similar succession of types and each $n$ succeeding types comprising a complete set; means for advancing said carrier so that said types pass along said hammers and parallel thereto whereby any position in which any type is in front of any hammer is a printing position and in each printing position one type is in front of each hammer, and after passage through any $n$ succeeding printing positions, a complete set of types has passed in front of any hammer, means for producing control pulses in synchronism with the movement of said carrier as it passes along said hammers; an associating means including $n$ output channels; means for activating said channels in synchronism with said carrier advancing and cyclically with the passage of any complete type set in front of any hammer; a like purality of $n$ read out wires respectively connected to said channels, each read out wire coupled to a plurality of elements corresponding to the number of columns, one element of each column, and pertaining to those lines corresponding to and representative of a like combination of type characters as simultaneously positionable in front of said hammers in printing position upon movement of said carrier; and means for feeding said control pulses as read and pulses to said channels for passage into the respective activated channel.

3. In a high speed printing apparatus, the combination comprising: a storage matrix register having storage cores, line wires and column wires disposed so that there is one core for each intersection of a line and of a column; printing hammers associated for control to said column wires; an endless type carrier supporting at least two complete sets of $n$ types with all sets being disposed on said carrier at similar succession of types and every $n$ succeeding types constituting a complete set; means for advancing said carrier so that said types pass along said hammers and parallel thereto whereby any position in which any type is in front of any hammer is a printing position and in each printing position one type is in front of each hammer, and after passage through any $n$ succeeding printing positions, a complete set of types has passed in front of any hammer; means for producing control pulses in synchronism with the movement of said carrier as it passes along said hammers; a plurality of $n$ circularly arranged contacts; a like plurality of read-out wires respectively connected to said contacts, each read out wire passing through a plurality of cores corresponding to the number of columns, one core of each column, at the cores of those lines corresponding to a like type combination simultaneously positionable in front of said hammers due to movement of said carrier; a rotatable contact arm and drivingly connected to said carrier advancing means successively engaging said plurality of contacts; and means for feeding said control pulses as read out pulses to said contact arm for passage into said read out wires.

4. In a high speed printing apparatus, the combination comprising: a storage matrix register having storage cores, line wires and column wires disposed so that there is one core for each intersection of a line and of a column; electrically operated printing hammers connected for control to said column wires; an endless type carrier supporting at least two complete sets of $n$ type with all sets being disposed on said carier at similar succession of types and every $n$ succeeding types constituting a complete set; means for advancing said carrier so that said types pass along said hammers and parallel thereto whereby any position in which any type is in front of any hammer is a printing position and in each printing position one type is in front of each hammer, and after passage through any $n$ succeeding printing positions, a complete set of types has passed in front of any hammer; means for producing control pulses in synchronism with the movement of said carrier as it passes along said hammers; a plurality of electronic switching stages; a like plurality of read out wires respectively connected to said stages, each read out wire passing through a plurality of cores corresponding to the number of columns, one core of each column, and at the cores of those lines corresponding to a like type combination simultaneously positionable in printing position in front of said hammers upon movement of said carrier; means for continuously, successively switching-on said stages with respectively connected read out wires in synchronism with said carrier movement; and means connected for feeding said control pulses as read out pulses to said stages for passing into the respectively switched-on read out wire.

5. Device as set forth in claim 2, said last mentioned means including a gate having input, output and gating terminal, said input terminal being connected to said control pulse producing means, said output terminal being connected to said associating means, and means for deriving a pulse from said matrix register indicating completion of storage and for feeding it as gating pulse to said gating terminal.

6. Device as set forth in claim 2 said last mentioned means including a gate having an input terminal connected to said control pulse producing means, an output terminal connected to said associating means for feeding said control pulse into the respectively activated channel, and having a gate terminal; a switching means connected to said gate terminal; means for deriving a signal from said storage matrix register indicating completion of storage and feeding it to said switching means so as to activate said gate; and means for producing a signal indicative of completion of one cycle of channel activation and for feeding said signal to said switching means so as to close said gate.

7. Device as set forth in claim 6 said last mentioned means including a counter connected so as to be responsive to the control pulses permitted to pass through said gate and producing said signal after having counted up to a number of pulses similar to the number of types in one set.

8. Device as set forth in claim 7, said counter having an adjustable number of counting stages.

9. In a full automatic high speed printing apparatus the combination comprising: a storage matrix register having storage elements, line wires and column wires respectively intersecting at said storage elements for storing intelligence therein; a counter connected for successively energizing said column wires during storage; electrically controllable printing hammers electrically connected to said column wires; an endless type carrier supporting at least two complete sets of $n$ types with all sets being disposed on said carrier at similar succession of types and every $n$ succeeding types constituting a complete set; means for advancing said carrier so that said types pass along said hammers and parallel thereto whereby any position in which any type is in front of any hammer is a printing position and in each printing position one type is in front of each hammer, and after passage through any $n$ succeeding printing positions, a complete set of types has passed in front of any hammer; means for producing control pulses in synchronism with the movement of said carrier as it passes along said hammers; an associating means including a plurality of $n$ output channels; means for activating said channels in synchronism with said carrier movement and cyclically with the passage of complete type sets in front of any hammer; a like plurality of read out wires respectively connected to said channels, each read out wire being coupled to a plurality of storage elements corresponding to the number of columns, one element of each column, and at the elements of those lines constituting a like type combination simultaneously positionable in front of said hammers in printing position upon movement of said carrier; a gate having its input terminal connected to said control pulse producing means and its output terminal connected to said associating means so that said control pulses may pass into the respective activated channel for read out, said gate further having a gating terminal; means for deriving a gate-opening pulse from said counter upon completion of storage; and means for producing a gate-closing pulse after completion of one channel-activating-cycle.

10. Apparatus as set forth in claim 9, said last mentioned means including a second counter connected to said output-gate terminal and counting the number of gated control and read out-pulses, and producing said gate closing pulse after counting a number similar to the number $n$ of types of one set.

11. Apparatus as set forth in claim 9, said last mentioned means including, means for selectively connecting the input of said counter to said output-gate terminal, circuit means for deriving a counting signal from an intermediate counter stage representing a number $n$ equal to that defining a set of types, and being connected for feeding said counting signal as gate closing signal to said gate terminal; and means responsive to said last mentioned counting signal for disconnecting said counter from said output gate terminal and connecting it to a storage input pulse source.

12. Apparatus as set forth in claim 9, said last and next to last mentioned means including: a switch connected for governing said gate terminal for opening and closing said gate; circuit means including a first switching blade normally interconnecting said switch and said counter for deriving a gate-opening signal therefrom upon completion of storage; circuit means for deriving a counting signal from an intermediate counter stage representing a number $n$ equal to that defining a set of types, and connected to said switch for feeding said counting signal as gate closing signal thereto; circuit means including a normally open, second switch blade for connecting said output gate terminal to the counter input; a first relay means connected to be responsive to said counting signal; a second relay means connected to be responsive to said counter when producing said gate opening pulse; and a third relay means governing said two switching blades and keeping them in their normal position when deenergized, said third relay means connected for being energized by said second relay means and deenergized by said first relay means.

13. Apparatus as set forth in claim 12, including a plurality of diodes individually connected with one electrode to said column wires and connected with their respective other electrodes to a common line, and means including a normally closed third switching blade governed by said third relay means, for connecting said common line to a voltage source terminal.

14. Apparatus as set forth in claim 9 including a plurality of diodes individually connected with one electrode to said column wires, and connected with their respective other electrodes to a common line, and means including switching means for connecting said common line to a voltage source terminal.

15. In a high speed printing apparatus, the combination comprising: an endless type carrier supporting at least two complete sets of types, each set including $n$ types with all sets being disposed on said carrier with similar succession of types and every $n$ succeeding types comprise one set; a plurality of printing hammers; means for moving said carrier in front of said hammers parallel thereto whereby all of said hammers are individually and simultaneously alignable in a printing position with respectively a similar plurality of succeeding types on said carrier for printing so that after passage through $n$ succeeding printing positions a complete set of types has passed in front of any hammers; a pulse generator producing electrical control pulses in synchronism with said moving types; a storage register having a plurality of storage elements; a plurality of $n$ register read out means, each read out means being operatively connected to a plurality of storage elements, one for each hammer and capable of storing signals representing a predetermined combination of type characters as respectively positionable simultaneously in front of said hammers in printing position therewith upon movement of said carrier; an associating device including $n$ output channels respectively connected to said $n$ register read out means; means for activating said channels in synchronism with said carrier movement through printing positions and cyclically with the passage of a complete type set in front of any hammer; means for operatively connecting said storage elements to said hammers; and means for feeding control and read out pulses into said respectively activated channels.

References Cited in the file of this patent

UNITED STATES PATENTS

| | | |
|---|---|---|
| 2,692,551 | Potter | Oct. 26, 1954 |
| 2,757,605 | Dumey | Aug. 7, 1956 |
| 2,831,424 | MacDonald | Apr. 22, 1958 |
| 2,918,865 | Wooding | Dec. 29, 1959 |
| 2,936,704 | Hense | May 17, 1960 |
| 3,048,330 | Hense | Aug. 7, 1962 |